United States Patent [19]

Ohki et al.

[11] Patent Number: 6,042,002
[45] Date of Patent: Mar. 28, 2000

[54] HOLDING APPARATUS FOR A PLURALITY OF IC CARDS FACILITATING TRANSACTIONS OF ELECTRONIC MONEY AMONG THE IC CARDS

[75] Inventors: Masayuki Ohki; Atsuhiko Urushihara; Jun Furuya, all of Kokubunji; Shigeyuki Itoh, Kawasaki; Hiroki Kitagawa, Tokyo; Takao Oosawa, Niiza, all of Japan

[73] Assignee: Hitachi, Ltd., Tokyo, Japan

[21] Appl. No.: 08/759,806

[22] Filed: Dec. 3, 1996

[30] Foreign Application Priority Data

Dec. 8, 1995 [JP] Japan ................................ 7-320629
Dec. 21, 1995 [JP] Japan ................................ 7-333029

[51] Int. Cl.⁷ .................................................. G06F 19/00
[52] U.S. Cl. ......................... 235/379; 235/380; 235/382; 902/24
[58] Field of Search .................................. 235/379, 381, 235/439, 440, 441, 486, 492, 382; 902/26, 24; 194/200

[56] References Cited

U.S. PATENT DOCUMENTS

| | | | |
|---|---|---|---|
| 3,833,885 | 9/1974 | Gentile et al. ........................... | 235/379 |
| 3,845,277 | 10/1974 | Voss et al. .............................. | 235/379 |
| 4,087,680 | 5/1978 | Mack et al. ............................. | 235/380 |
| 4,512,453 | 4/1985 | Schuller et al. ........................ | 194/200 |
| 4,562,341 | 12/1985 | Ohmae et al. .......................... | 235/379 |
| 4,598,378 | 7/1986 | Giacomo ................................. | 194/200 |
| 4,802,218 | 1/1989 | Wright et al. ........................... | 235/492 |
| 4,906,828 | 3/1990 | Halpern ................................... | 235/379 |
| 4,977,595 | 12/1990 | Ohta et al. .............................. | 235/379 |
| 5,209,335 | 5/1993 | Shuren et al. ........................... | 194/200 |
| 5,318,164 | 6/1994 | Barnes et al. ........................... | 194/200 |
| 5,434,395 | 7/1995 | Storck et al. ........................... | 235/379 |
| 5,453,601 | 9/1995 | Rosen ...................................... | 235/379 |
| 5,455,409 | 10/1995 | Smith et al. ............................ | 235/441 |
| 5,519,669 | 5/1996 | Ross et al. .............................. | 902/6 |

FOREIGN PATENT DOCUMENTS

| | | | |
|---|---|---|---|
| 3840-624 | 6/1990 | Germany ............................... | 194/200 |
| 82201100 | 1/1982 | Japan . | |
| 403251986 | 11/1991 | Japan .................................... | 194/200 |
| 5-94458 | 4/1993 | Japan . | |
| 6-111080 | 4/1994 | Japan . | |
| 7-254035 | 10/1995 | Japan . | |

*Primary Examiner*—Michael G Lee
*Assistant Examiner*—Drew A. Dunn
*Attorney, Agent, or Firm*—Beall Law Offices

[57] ABSTRACT

In a value box in an electronic money system with a high reliability which is excellent in usage efficiency and maintenance, a front door and a rear door are provided before and after a main body portion and an indicator is provided to show operating states of a door locking key and a whole value box, particularly, a state in which a trouble or the like has occurred in the value box and a maintenance is necessary is provided for the front door. A communication line for transmitting information regarding power source lines and electronic money for a number of IC card readers/writers provided in the main body is connected to the rear door. The front door can be opened by hinges. A number of IC card readers/writers are enclosed in the main body portion. IC card inserting slots of IC cards for those IC card readers/writers are arranged and provided in the front surface of the main body portion at two upper and lower stages. An IC card operation indicator is provided in correspondence to each IC card inserting slot.

41 Claims, 10 Drawing Sheets

HOLDING APPARATUS FOR A PLURALITY OF IC CARDS FACILITATING TRANSACTIONS OF ELECTRONIC MONEY AMONG THE IC CARDS

BACKGROUND OF THE INVENTION

The invention relates to a holding apparatus for electronic money in an electronic money processing system. In the present application, the processing system for the electronic money is referred to as an "electronic money system" for simplicity of explanation.

In recent years, an electronic money system for transmitting and receiving electronic money by a communication between cards in each of which the electronic money is contained has been proposed. The card which is used for such a system is constructed by, for example, a microprocessor having therein a communicating function and a memory such as an EEPROM or the like to store a processing program and a balance of the electronic money. The electronic money of the card can be deposited and drawn into/from other cards by using an exclusive-use terminal or through an electronic money system which is constructed in a manner such that a terminal equipped in a bank, a shop, an individual home, or the like can arbitrarily be connected through a communication line.

The electronic money system proposed above is under development because which function and form each equipment constructing the system should have is not determined yet.

In the following embodiment of the present invention, a storing circuit to hold information of a money amount of electronic money and a money amount information writing circuit to write the money amount information into the storing circuit are constructed as one pair. The storing circuit of the pair can be accessed and rewritten by the money amount information writing circuit, and the information in the storing circuit cannot be rewritten without intervention of the money amount information writing circuit, thereby maintaining the safety of the electronic money. In the electronic money system proposed above, an IC card is proposed as a holding apparatus for holding the electronic money. In the following embodiment of the invention, however, the IC card is not an absolute necessary condition.

SUMMARY OF THE INVENTION

It is an object of the invention to provide an electronic money holding apparatus in a electronic money system, in which a deposit of an electronic money or a withdrawal of an electronic money can be simultaneously executed among a plurality of electronic money holding apparatuses.

As one solving measure for accomplishing the above object, there is provided an electronic money holding apparatus to hold an electronic money in order to hold the deposited electronic money or to meet a request for withdrawal of an electronic money, wherein a plurality of recording circuits, each for storing information of at least a holding amount of the electronic money, are arranged and there is provided a selecting circuit for selecting which one of the recording circuits corresponds to a request for a deposit or withdrawal of money from/to the outside to/from the holding apparatus of the electronic money.

The other solving measures to accomplish the above object will be explained in the following description of the embodiments.

DESCRIPTION OF THE PREFERRED EMBODIMENTS

An embodiment of an electronic money system and a holdings apparatus of an electronic money according to the invention will now be described in detail with reference to the drawings. For easy understanding, an example of a use method will be first specifically explained. When many and unspecified persons having bank accounts in banks use the banks, generally, the person withdraws cash from his savings in the bank or deposits his cash into the bank. In the electronic money system, an electronic money is used in place of cash. To maintain a safety of the electronic money, there is considered a method whereby a deposit and an withdrawal of the electronic money can be enabled between, for example, one holding apparatus of the electronic money and another holding apparatus of the electronic money and the deposit and withdrawal of the electronic money to/from the electronic money holding apparatus are disabled in principle from means other than the electronic money holding apparatuses. By providing such a rule, the safety of the electronic money can be raised. However, when a person withdraws cash by the electronic money from the bank, another person cannot use electronic money holding apparatuses between the banks for a period of time during which the other person is depositing an electronic money from an electronic money holding apparatus of the bank to a petty current electronic money holding apparatus (electronic purse) which the person possesses. Such a problem also occurs even when electronic money is paid to the bank.

Although the example of the bank and the petty current electronic money holding apparatus (electronic purse) of the person has been described above, a similar problem also occurs even when considering sales stores of a relatively middle scale or larger. For example, there are a number of selling areas in a department store and when money is, paid from a person by a form of electronic money in each selling area, it is necessary to collect sales money from each selling area. As mentioned above, when constructing in a manner such that the deposit and withdrawal of the electronic money are enabled between only the electronic money holding apparatuses in order to raise the safety of the electronic money, when sales money is collected from one selling area, the money collection from the other selling areas cannot be performed. According to the invention, such a problem can be solved as described in the embodiment hereinbelow.

Figure 1:
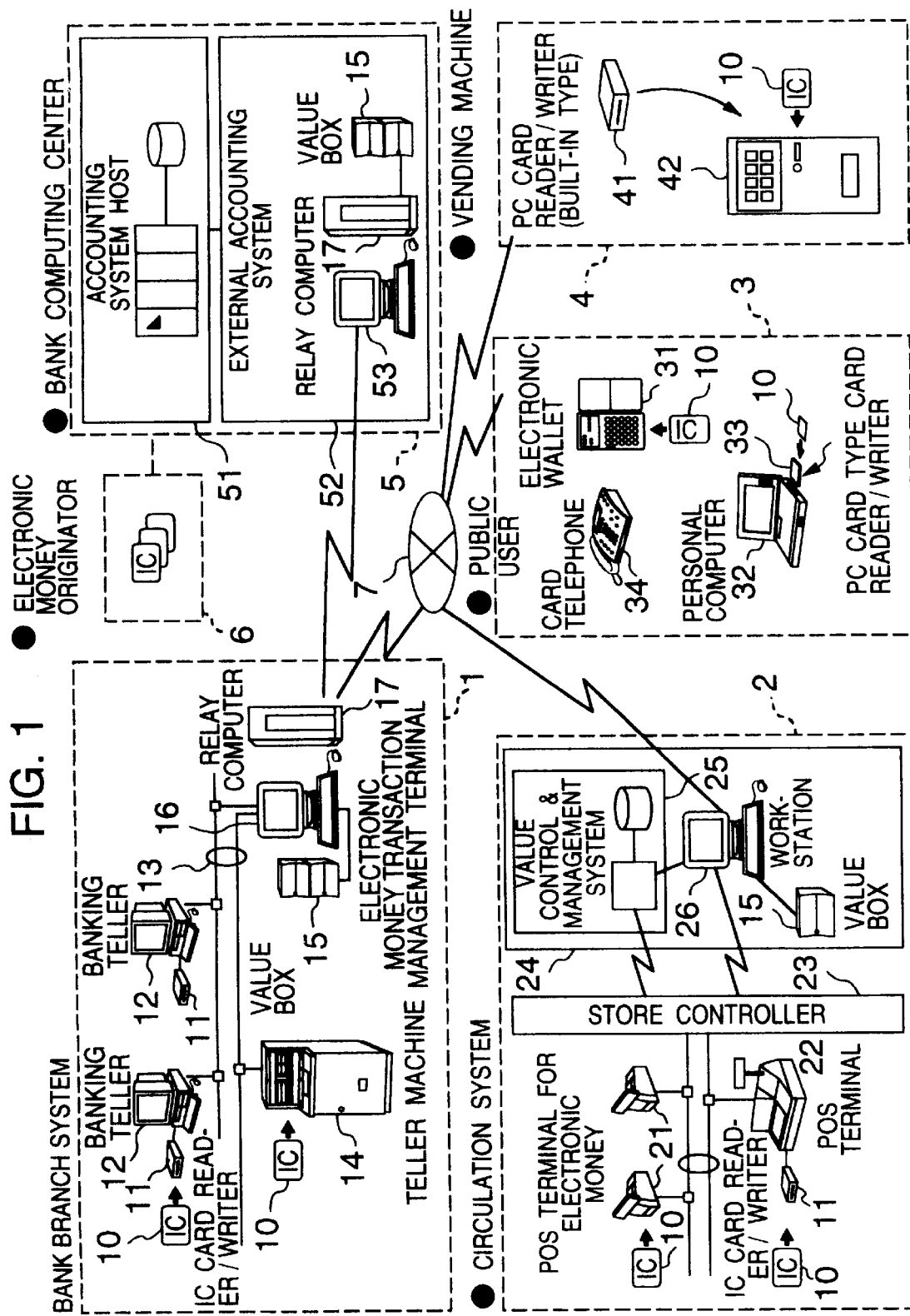
FIG. 1 is a block diagram showing a construction of an electronic money system to which a value box according to the invention is applied.

FIG. 1 shows a construction of an electronic money system according to an embodiment. Reference numeral 1 denotes a system in a bank branch; 2 a system in a sales store as a broad meaning incorporating a wholesale and the like (hereinafter, such a system is referred to as a retail store system for simplicity of explanation) 3 a shop of a very small scale of a person or private management (hereinafter, such a shop is referred to as a public user for simplicity of explanation) 4 a system for a vending machine; 5 a computing center for managing each branch of a bank; 6 an electronic money originator; 7 a public telephone line; 10 an IC card constructed, for example, so as to be easily portable in a petty current electronic money holding apparatus (electronic purse); 11 a reader/writer of an externally attached IC card; 12 a banking teller of the branch of the bank; 13 an internal communication line; 14 a cash automatic teller machine; 15 an electronic money holding apparatus (hereinafter, referred to as a value box for simplicity of explanation) showing an embodiment of the invention; 16 an electronic money transaction management terminal for electronic money; and 17 a relay computer for processing information so that the public communication network can be used and for transmitting and receiving. Reference numeral 21 denotes a POS terminal for an electronic money; 22 a POS terminal; 23 a store controller; 24 a center device for collecting management data of the sales store and holding and managing the money; 25 a value control and management system; 26 a workstation; 31 an electronic wallet; 32 a personal computer; 33 a PC card type card reader/writer; 34 an IC card telephone; 41 a built-in type IC card reader/writer; 42 a vending machine; 51 an accounting system host; 52 an external accounting system; and 53 a control terminal of the external accounting system.

The electronic money system shown in FIG. 1 is constructed by connecting the bank branch system 1, retail store system 2 indicative of a system of sales stores of a department store, a supermarket, or the like, personal computer 32 as an end user system 3, and IC card telephone 34 to the public telephone line 7. The electronic money system also has the vending machine 4 and the like. The construction in which the representative systems are provided one by one is shown. Actually, many systems are connected to the public telephone line 7 as necessary. The bank branch system and the bank computing center 5 can be also connected by an exclusive-use line or the like in place of the public communication network. The originator 6 is connected to the bank computing center 5.

The IC card 10 is constructed by providing therein: a microprocessor having a communicating function; and a memory such as an EEPROM or the like for storing a processing program and a balance of the electronic money. The person as a public user possesses the IC card. The IC cards are also possessed by the banks, shops, vending machines, and the like which participate in the electronic money system. The bank branch system 1 is constructed in a manner such that the banking teller terminal 12 and the automatic teller machine 14 are connected through the internal communication line 13 and are, further, connected to the bank computing center through the relay computer 17. However, for an electronic money settlement, the IC card reader/writer 11 is provided for the banking teller 12, the IC card reader/writer is built in the cash automatic teller machine 14, and the value box 15 according to the invention is connected to the bank computer center through the electronic money transaction management terminal 16. The bank computing center 5 is constructed by the accounting system host 51 and the accounting system 52 of the system. The external accounting system 52 is constructed so as to have the control terminal 53 of the system, relay computer 17, and value box 15 according to the invention.

The retail store system 2 is constructed in a manner such that the POS terminal is ordinarily connected to the center device 24 through the internal communication line 13 and store controller 23. For the electronic money settlement, the externally attached IC card reader/writer 11 is provided for the ordinary POS terminal 22 or the POS terminal 21 for an electronic money is connected to the POS terminal 22. The center device 24 has the value control and management system 25 and workstation 26 and is, further, equipped with the value box 15. The public user system 3 is mainly a personal user system and, simply, even only the electronic wallet 31 capable of displaying a balance of the electronic money in the IC card can fully exhibit the lowest function. A function such as an electronic calculator or the like can be also added to the electronic wallet 31. The personal computer 32 is constructed in a manner such that the PC card type card reader/writer 33 for the electronic money settlement is provided for a computer which the person possesses and can be connected to the public telephone line 7. The IC card telephone 34 in which a processing function for the IC card 10 to store the electronic money is provided for an ordinary telephone can be also used.

By providing two sets of card reader/writers for two sheets of IC cards into the personal computer 32 and IC card telephone 34 in the public user system 3, the electronic money can be transferred and received between the two IC cards. Thus, for example, a process similar to that in case of handling of ordinary cash such that the electronic money in the IC card of a husband is transferred to the IC card of a wife or the like can be executed. The vending machine system 4 is constructed by the vending machine 42 having the built-in type IC card reader/writer 41.

A method of using the electronic money system to which the invention constructed as mentioned above is applied will now be described. The IC cards 10 are distributed from the electronic money originator 6 to the banks, shops, vending machines, persons, and the like which participate in the system. The bank receives the electronic money in exchange for cash which is ordinarily circulated and stores the electronic money into the value box 15 provided in the external accounting system 52. As will be explained hereinlater, the value box 15 has therein many IC cards 10. The electronic money received from the electronic money originator is distributed and stored into each card 10. The electronic money that is store into the IC card in the value box 15 in the system 52 is distributed to the IC card 10 Ian the value box 15 in the bank branch system 1 installed in each bank branch.

The person as an end user who participates in the electronic money system possesses the distributed IC card 10, exchanges the savings of a persons own account in the bank to the electronic money and withdraws at the banking teller 12 or by the automatic teller machine 14 in the bank branch system 1, and stores into the self IC card 10. The person connects the personal computer 32 having the possessed PC card type reader/writer 33 or the IC card telephone 34 to the bank branch system 1 through the public telephone line 7. In a manner similar to the above case, the person can exchange the savings of a persons own account in the bank to the electronic money and withdraw and store into the self IC card 10.

When the electronic money is withdrawn, the IC card which the person possesses is connected to the IC card in the value box 15 in the bank branch system 1 through the banking teller terminal 12, teller machine 14, personal computer 32, or the reader/writer of the IC card telephone 34 by the communicating function provided in the self card. Under the control of the electronic money transaction management terminal 16, the electronic money stored in the IC card 10 in the value box 15 in the bank branch system 1 is stored into the IC card 10 which the person possesses. In this instance, the balance of the electronic money stored in the IC card 10 in the value box 15 in the bank branch system 1 is reduced by only the amount stored in the IC card 10 which the person possesses. A withdrawal of a deposit from a personal account is executed in a manner similar to the conventional one. Although the case where the money amount of the savings of the personal bank account; is withdrawn and stored into the IC card which the person possesses has been described above, the person can also bring cash to the window of the bank or the window of the electronic money originator and can request to store the cash into his IC card. The electronic money in the IC card can be also returned into the IC card in the value box 15 in the bank branch system 1 through the banking teller terminal 12, automated teller machine 14, and personal computer 32 and can be simultaneously deposited into a persons own account.

The user who stored the electronic money into the self IC card 10 as mentioned above can buy some goods or receive various services in various shops or the like by using the IC card in a manner similar to cash. It is now assumed that the user who had stored the electronic money into the self IC card 10 bought some goods at a shop and brought the purchased goods to the counter of the POS terminal for payment. A handling person allows bar codes or the like to be read, thereby inputting sales prices of the goods from the POS terminal 21 or 22 and allows the total amount to be calculated and requests to the customer in a manner similar to the case of the ordinary transaction.

When the customer pays by the IC card in which the electronic money has been stored in place of cash, the customer inserts the IC card into a card inserting slot of the POS terminal 12 for the electronic money or into the IC card reader/writer 11 connected to the ordinary POS terminal 22. Thus, the IC card of the customer and one sheet of IC card in the value box 15 installed in the center apparatus 24 of the shop are connected through the internal communication line 13 and workstation 26. The electronic money in the IC card of the customer is transferred to one sheet of IC card in the value box 15 installed in the center apparatus 24. A receipt is outputted from the POS terminal and the payment process by a purchase is finished. In this case, the electronic money in the IC card of the customer is reduced by only the amount used for the purchase and is added to the electronic money of the IC card of the shop.

Explanation has been made above on the assumption that the transaction prices of the goods are paid in the retail store system including a number of POS terminals and the center apparatus 24 having the value box in which a number of IC cards are enclosed. However, in case of a system such that only one money deposit machine is equipped in a private shop or the like, an IC card reader/writer for the IC card of the customer is provided for the money deposit machine and the IC card which the shop possesses is provided in the money deposit machine, so that the payment by the electronic money can be performed between the IC card which the shop possesses and the IC card of the customer which is connected through the IC card reader/writer. As mentioned above, the electronic money in the IC card which the shop possesses can be deposited into the bank account or can be changed to cash at the window of the bank.

Further, in the foregoing retail store system having the POS terminals, as a constructing method of the system, the IC card is provided for each POS terminal, the deposit and withdrawal of the money between the IC card of the POS terminal and the IC card of the customer are once executed between the IC card in the POS terminal and the IC card of the customer, and the electronic money can be also shifted from the POS terminal to the IC card in the value box 15 of the center apparatus 24 as necessary.

When the vending machine 42 or the like participates in the electronic money system, it is sufficient that the built-in type IC card reader/writer 41 is provided in the vending machine 42, the IC card is provided for the vending machine itself, and the customer executes the deposit and withdrawal of the money between the IC card of the vending machine itself and the IC card inserted into the IC card reader/writer 41.

An embodiment of the value box of the invention which is used in the electronic money system that is used as mentioned above will now be described with reference to the drawings. As also described above, because of the reason to assure the safety of the electronic money, the system of FIG. 1 is made in a principle that the deposit and withdrawal of the electronic money cannot be performed only between a pair constricted by the memory for storing the holding amount of the electronic money or the like and the writing circuit which forms a pair with the memory and another pair. As a pair constructed by the memory to store the holding amount of the electronic money or the like and the writing circuit to write the holding amount or the like into the memory, the foregoing IC card can be mentioned as a form which can be relatively easily used. The IC card is one form of the pair which is easily used and is not an absolute condition. By constructing the pair by an IC circuit, the pair becomes absolute and it is possible to prevent a possibility such that a new pair is formed with another circuit and an illegal action is performed. By making the card shape thin, the IC card can be easily carried, namely, the IC card is easily portable. From those reasons, although the following explanation will be made on the assumption of an IC card anyway, it is sufficient to use a pair constructed by the memory to store the holding amount of the electronic money or the like and the circuit to write the holding amount or the like into the memory even in the following description.

Figure 2:
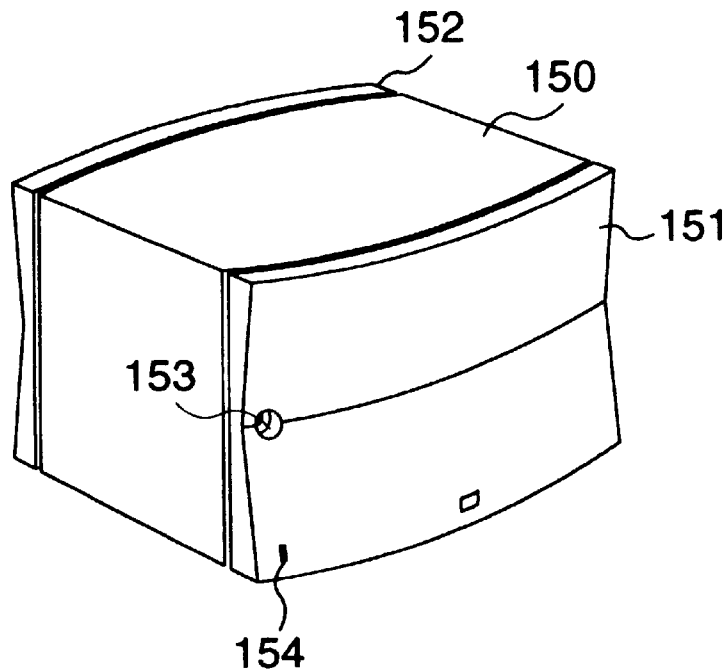
FIG. 2 is a perspective view showing an outside appearance of the value box according to the first embodiment of the invention.
Figure 3:
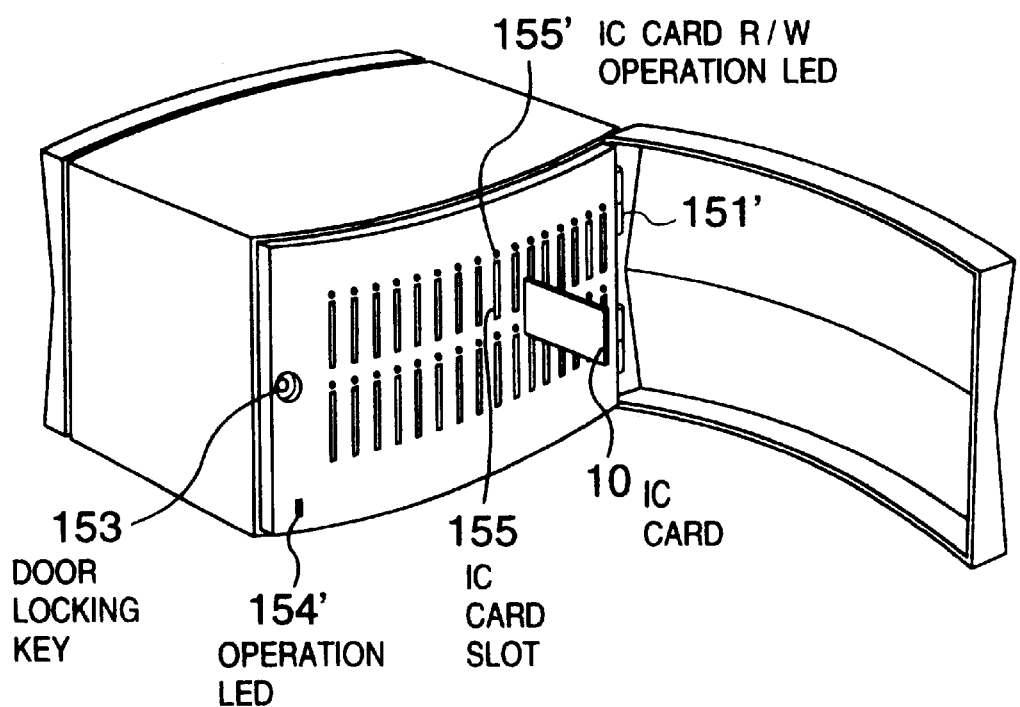
FIG. 3 is a diagram showing a state in which a door of the value box shown in FIG. 2 is opened.

FIG. 2 is a perspective view showing an external view of the value box according to the first embodiment of the invention. FIG. 3 is a diagram showing a state in which a door of the value box shown in FIG. 2 is opened. In FIGS. 2 and 3, reference numeral 150 denotes a main body portion; 151 a front door; 151' a hinge; 152 a rear door; 153 a door locking key; 154 and 154' operation indicators; 155 an IC card inserting slot of the IC card reader/writer; and 155 an IC card operation indicator. The other portions similar to those in the case of FIG. 1 are designated by the same reference numerals. All of the main body, hinges, doors, and the like are made of a hard metal.

The value box 15 according to the first embodiment of the invention is constructed by providing the front door 151 and rear door 152 in the front and rear portions of the main body portion 150 as shown in an external view in FIG. 2 of the box 15. For assuring the safety, the door locking key 153 is provided for the front door 151 as necessary. The indicator 154 to indicate an operating state of the whole cashbox, particularly, to show that a trouble or the like occurred in the and that maintenance is required is provided. The indicator 154 is constructed by, for example, an LED or the like. It is preferable to construct the indicator 154 so as to indicate by emitting blue light when the value box 15 is normally operating arid to indicate by emitting red light when the cashbox needs to be repaired.

Although not shown, power source lines for a number of IC card readers/writers which are provided in the main body are connected to the rear door 152. A communication line for transmitting information regarding this electronic money which is transferred and received between a number of IC card readers/writers and the other IC card reader/writer is also connected. By opening the rear door 152, the internal equipment can be inspected and repaired. The communication line which is connected can transmit the signal in which the signals that are transferred and received to/from all of the IC card readers/writers which are enclosed in the value box 15 are multiplexed. A circuit for multiplexing the signals is built in the value box 15.

The front door 151 can be opened by the hinges 151'. In FIG. 3 showing a state in which the front door 151 is opened, a number of IC card readers/writers are enclosed in the main body unit 150. The card inserting slots 155 of the IC cards 10 for the IC card readers/writers are arranged at two upper and lower stages; and provided in the front surface of the main body portion 150. The IC card operation indicators 155' are provided in correspondence to the slots 155. The indicators 155' can be constructed in a manner such that the each indicator displays the operating state of each IC card reader/writer so as to indicate a normal or abnormal state in a manner similar to the case of the indicator 154 mentioned above or that a state in which a life of each IC card reader/writer approaches the end, a state in which it has reached the end, a state in which a trouble has occurred, or the like is displayed by changing a display color of the LED. The indicator 154' has substantially the same function as that of the indicator 154 provided for the front door 151. Therefore, if the portion of the front door 151 at the position corresponding to the indicator 154' is made of a transparent window, there is no need to provide the indicator 154 provided in the front door 151.

Figure 4:
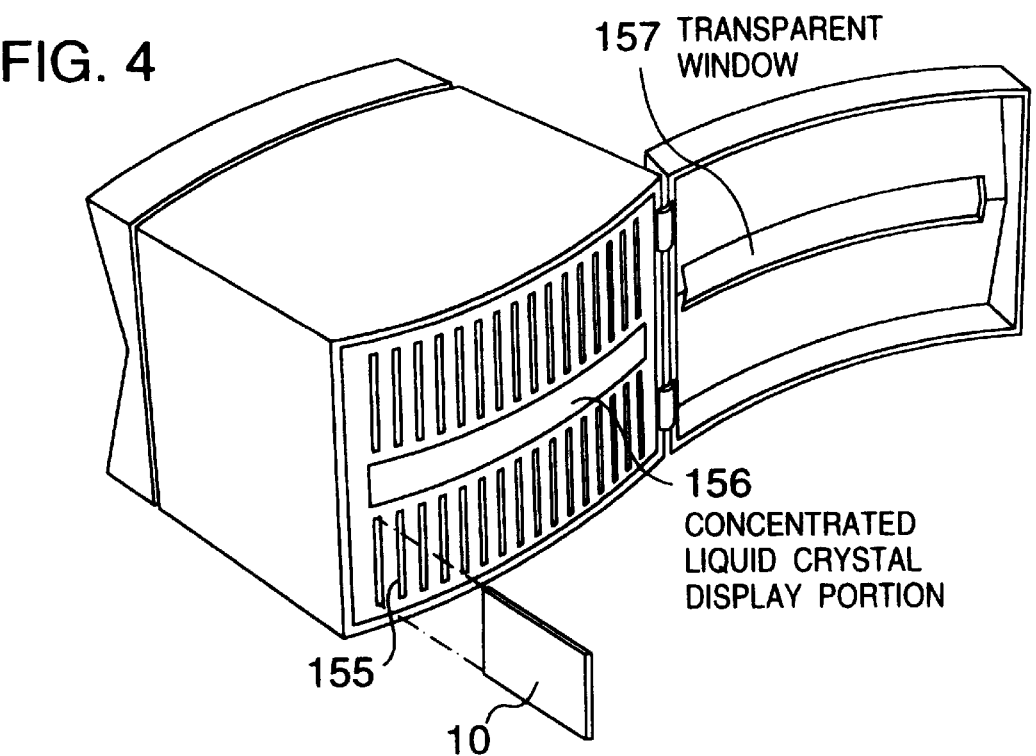
FIG. 4 is a perspective view showing a construction of a value box according to the second embodiment of the invention.

FIG. 4 is a perspective view showing an external view of value box according to the second embodiment of the invention. In the diagram, reference numeral 156 denotes a concentrated display portion and 157 indicates a transparent window. The other portions similar to those in FIGS. 2 and 3 are designated by the same reference numerals. The second embodiment of the invention shown in FIG. 4 is constructed by providing the concentrated display portion 156 by a liquid crystal display apparatus or the like into an intermediate portion of the IC card inserting slots 155 at two upper and lower stages. The concentrated display portion 156 can perform a display of an operating state of the IC card inserted in the inserting slot 155 of each IC card, a display indicating t,hat he life of the IC card approaches the end, a display indicating that an amount of electronic money in the IC card approaches the maximum capacity of the memory, a display to inform of a trouble of the IC card, or the like. By switching by a switch or the like, the number of accessing times to the memory in the IC card can be also displayed in the display portion. By providing the transparent window 157 at the position facing the front door 151, even when the front door 151 is closed, the concentrated display portion 156 can be seen from the outside.

Although the case of displaying the life of the IC card and the number of accessing times has been described above, the reason why the life of the IC card and the number of accessing times are monitored is because the IC card has a life in terms of a nature of a memory device built in the IC card. Namely, although the IC card 10 needs to store the balance of the electronic money into the internal memory and it is necessary to carry the IC card as a card, when using a battery or the like, a maintenance and an exchange of the battery have to be performed and it is not practical. Therefore, the IC card is constructed by using a memory which can store the memory contents without needing a power source such as a battery or the like. As such a memory, an EEPROM is generally used. However, when the EEPROM is accessed a predetermined number of times or more, the storing and holding operations become unstable and the memory cannot be used in the worst case.

Therefore, in the embodiment, the number of accessing times to the IC card which was set is counted for every access of the IC card. When the count value reaches a predetermined number, for example, 30,000 times, such a state is set to the life of the IC card. When the number of accessing times reaches such a predetermined number or a value which is slightly before it, a display to indicate the life of the IC card is performed and an alarm is generated. When the IC card which is enclosed in the value box 15 is used in the bank branch system 1 or retail store system 2, since it is connected to many and unspecified other IC cards and used, if a plurality of IC cards which are enclosed in the value box 15 are unevenly used, an exchange time differs for every IC card, resulting in an increase in maintenance works. Therefore, the value box according to the embodiment of the invention has therein a control circuit for allowing the enclosed IC cards to be averagely used the same number of times in response to the accesses from the outside.

Figure 5:
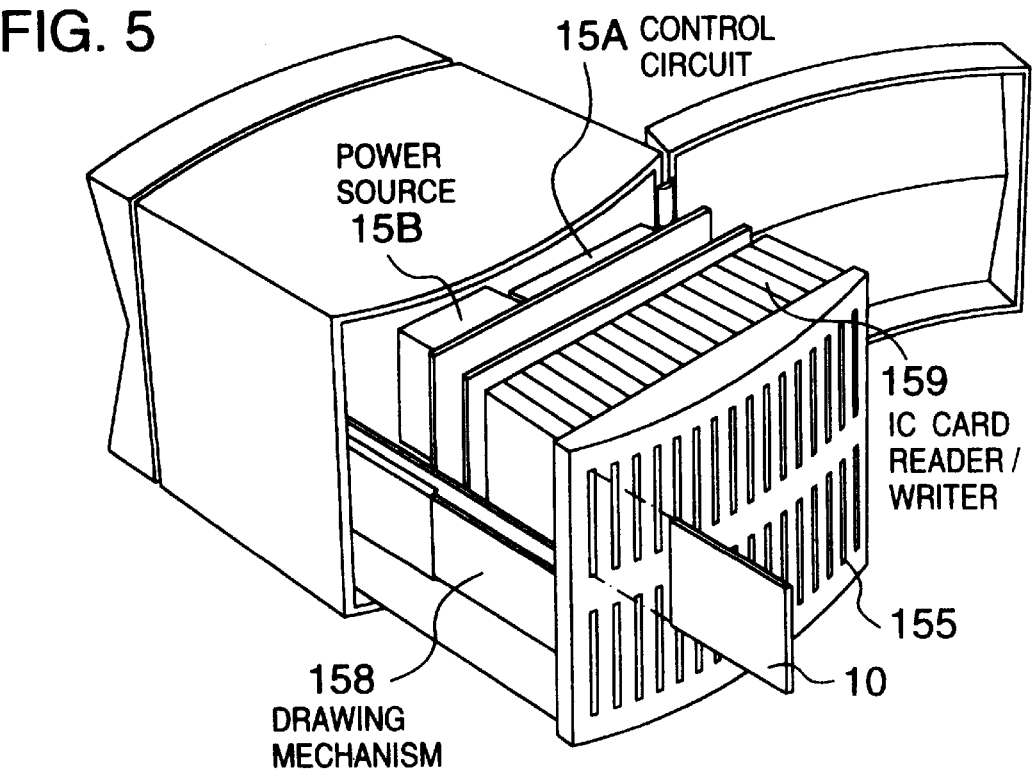
FIG. 5 is a perspective view showing a construction of a value box according to the third embodiment of the invention.

FIG. 5 is a diagram showing a construction of a value box according to the third embodiment of the invention. Reference numeral 158 denotes a drawing or drawer mechanism; 159 an IC card reader/writer; 15A a control circuit; and 15B a power source.

The third embodiment of the invention shown in FIG. 5 is constructed such that the apparatus in the main body cain be drawn outwardly. According to the value box 15 of the first or second embodiment of the invention described before, the IC card reader/writer, control circuit, power source, and the like are enclosed in the main body portion 150. However, according to the third embodiment of the invention, as shown in FIG. 5, by providing the drawing mechanism 158, the IC card reader/writer 159, control circuit 15A, and poser source 15B enclosed in the main body can be drawn outwardly in the front direction from the main body portion 150. With such a structure, the maintenance and inspection of the internal apparatus can be executed from the front side of the value box 15 without preparing a space for maintenance on the rear side of the value box 15.

Figure 6:
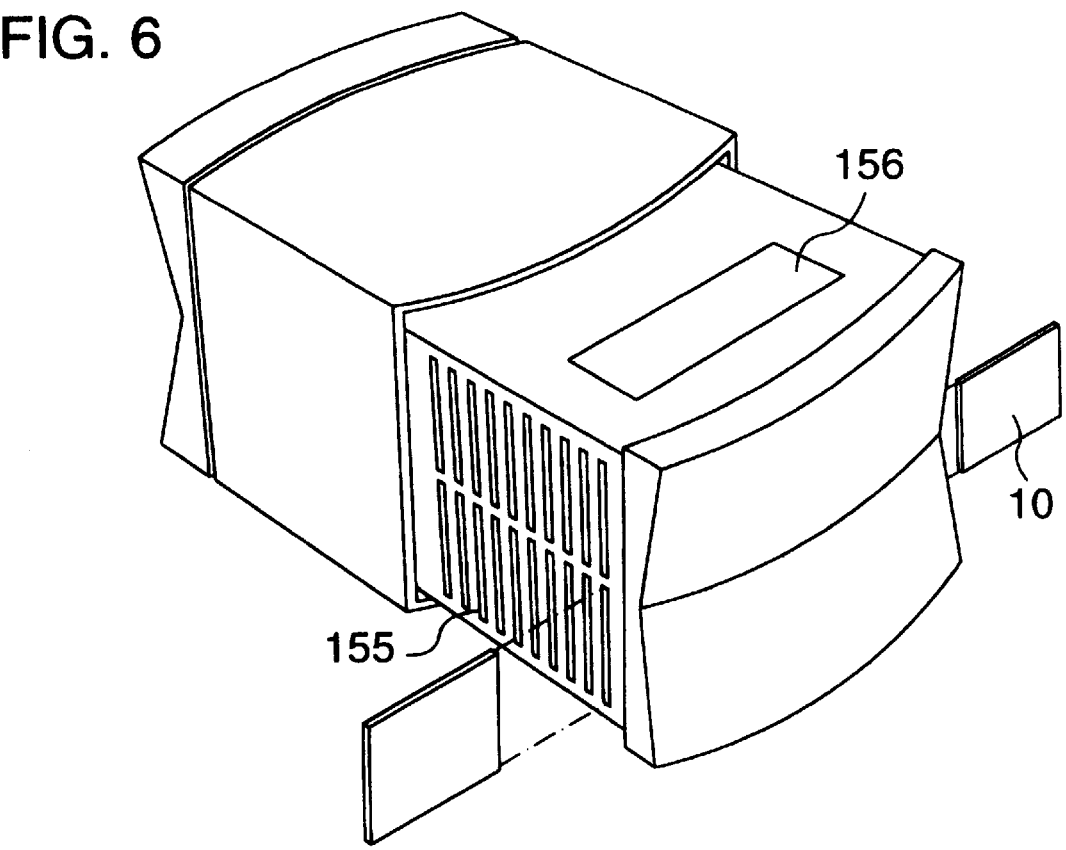
FIG. 6 is a perspective view showing a construction of a value box according to the fourth embodiment of the invention.

FIG. 6 is a perspective view showing a construction of a value box according to the fourth embodiment of the invention. The portions similar to those in FIGS. 2 to 5 are designated by the same reference numerals. In the first to third embodiments of the invention mentioned above, the IC card has been inserted from the front side of the main body portion 150. However, according to the embodiment shown in FIG. 6, the card inserting slots 155 of two stages are provided so that the apparatus in the main body is drawn out and the IC cards can be inserted from the right and left sides. In the embodiment, the front door 151 is not opened by hinges but is constructed as a front door of a drawer. In the case of this example, the concentrated display portion 156 can be also provided in the upper surface of the main body apparatus which was drawn outwardly. Even by the foregoing fourth embodiment, an effect similar to that in case of the first embodiment can be obtained and the apparatus can be used in a similar manner.

Figure 7:
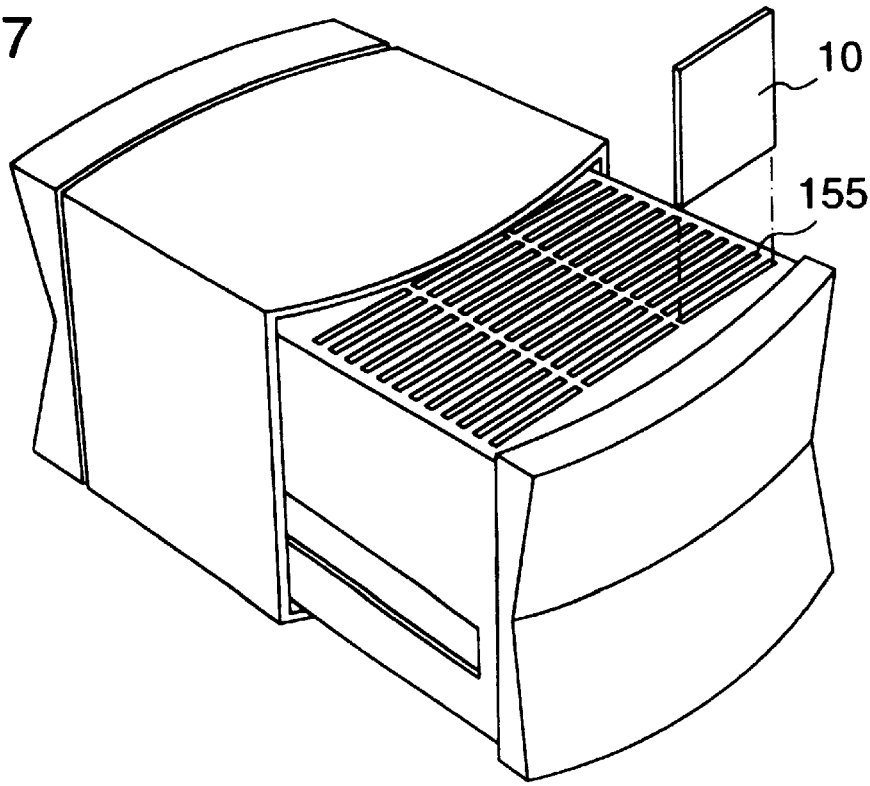
FIG. 7 is a perspective view showing a construction of a value box according to the fifth embodiment of the invention.

FIG. 7 is a perspective view showing a construction of a value box according to the fifth embodiment of the invention. Portions similar to those in FIGS. 2 o 5 are designated by the same reference numerals. In the first to third embodiments of the invention mentioned above, the IC card has been inserted from the front side of the main body portion 150. However, according to the fifth embodiment of FIG. 7, the card inserting slots 155 of three columns are provided so that the apparatus in the main body is drawn out and the IC cards can be inserted from the upper surface of the apparatus. According to this embodiment, the front door 151 is not opened by hinges but is constructed as a front door of the drawer.

Figure 8:
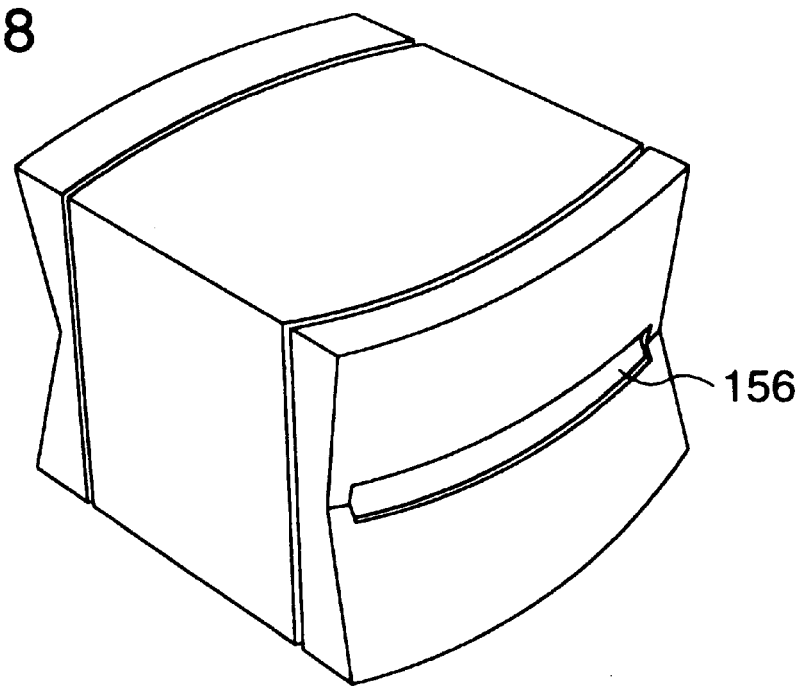
FIG. 8 is a perspective view showing a construction of a value box according to the sixth embodiment of the invention.

FIG. 8 is a perspective view showing a construction of a value box according to the sixth embodiment of the invention. In the drawing figure, reference numeral 156 denotes the concentrated display and the other portions similar to those in FIGS. 2 to 5 are designated by the same reference numerals. In the value box according to the sixth embodiment, the concentrated display using a liquid crystal or the like is provided for the front door 151 and can be used in combination with each of the foregoing embodiments except the second embodiment mentioned above and the operating state can be easily confirmed from the outside of the value box.

Figure 9:
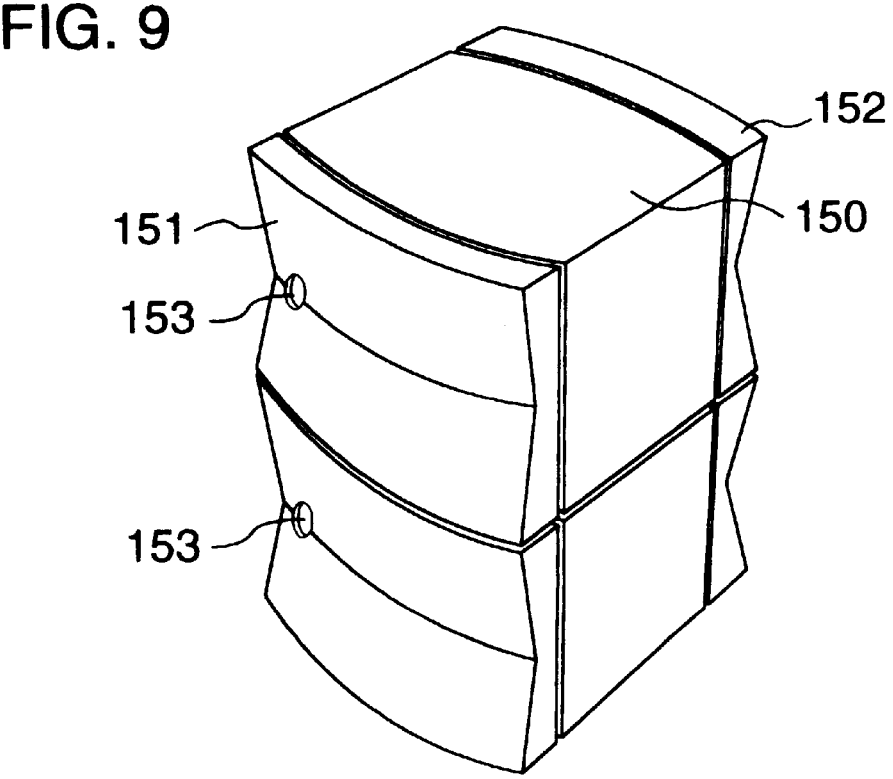
FIG. 9 is a diagram showing a state in which two value boxes according to each embodiment of the invention are piled.

FIG. 9 is a diagram showing a use example when a plurality of value boxes according to the embodiments of the invention are combined and used. The value boxes 15 according to the embodiments of the invention constructed as mentioned above can be piled in the vertical direction and used as shown in FIG. 9. In the example shown in FIG. 9, although the two value boxes 15 are piled in the vertical direction, a further larger number of cashboxes can be also piled and used or can be also arranged in the lateral direction and used. In such a case, if each value box is equipped with a mechanism to automatically mutually connect the value boxes when they are piled or arranged laterally and used and an interface for connection is provided in the cashbox, usage efficiency is further improved. In such a case, an indicator to display the occurrence of an error can be provided for each value box. By such an indicator, the one of a number of value boxes in which the error occurred can be immediately known from the outside and the maintenance can be promptly executed.

In the foregoing embodiments, one or a set of value boxes have been provided for the system which needs the value boxes. According to the invention, however, it is also possible to provide a master value box and (one or a set of) slave value boxes and to double the value boxes by controlling a multiplex transmission of signals by the master value box. The value boxes can be connected through optical fibers or by photosignals. Thus, the reliability of a system in which the value boxes contain electronic money and in which the occurrence of an error has to be avoided as much as possible can be improved.

The transmission of the signal by the optical fiber can be used at any place in the system for the purpose of improvement of the reliability of the system without being limited to the transmission between the value boxes.

Further, the value box 15 according to each embodiment of the invention mentioned above is formed in a shape such that the front door 151 is curved to the front side and the center portion in the vertical direction is concave to the inside. With such a structure, when a number of value boxes are piled or arranged in the lateral direction, the shape which is formed by all of the front doors 151 can be made excellent in visual and design viewpoints.

According to each of the foregoing embodiments of the invention, it is possible to provide the value box in the electronic money system having an internal structure such that a plurality of IC cards for performing the settlement of the electronic money among the IC cards which many and unspecified users possess car be efficiently enclosed and the pulling and inserting operations of each IC card and the maintenance of the parts such as power source, circuit board, and the like can be easily performed. It is also possible to provide the value box in the electronic money system in which the lives of the IC cards enclosed can be monitored and the lives of the IC cards enclosed can be averaged.

According to the embodiments, in the value box in the electronic money system in which a number of pairs, for example, IC cards in each of which an electronic money has been stored are enclosed and which executes the deposit and withdrawal of the electronic money between the pair and another pair, for example, other IC cards in the outside of the cashbox, the value box is constructed in a manner such that it has at least the main body portion and the front door and the control circuit, power source, and a number of IC card readers/writers are enclosed in the main body portion, and the inserting slots for the IC card readers/writers are arranged in the front surface of the main body portion, so that there is an advantage such that the management and maintenance can be easily executed. In the above embodiments, the internal apparatus including the control circuit, power source, and a number of IC card readers/writers which are enclosed in the main body portion is constructed so that it can be drawn out to the front side by the drawing mechanism. Thus, the value box has a structure such that the inserting slots of the IC card readers/writers are arranged on both side surfaces or the upper surface of the drawing portion constructed so that it can be drawn out from the main body portion. With this structure, it is excellent in maintenance and repair.

Further, according to the embodiments, there is provided the display portion such that the number of accessing times for each of the many IC cards is counted and, when the count value reaches a predetermined number or approaches the predetermined number, such a fact is displayed. The concentrated display portion to display the operating state of each of the many IC cards including such a display is provided in the front surface of the front door or in the front surface of the main body portion. When the concentrated display portion is provided in the front surface of the main body portion, by forming the portion at the position corresponding to the front door as a transparent window, the object is accomplished. The object is accomplished by controlling the accesses to the IC cards by the control circuit provided in the main body portion so as to average the numbers of accessing times to the many IC cards.

Figure 10:
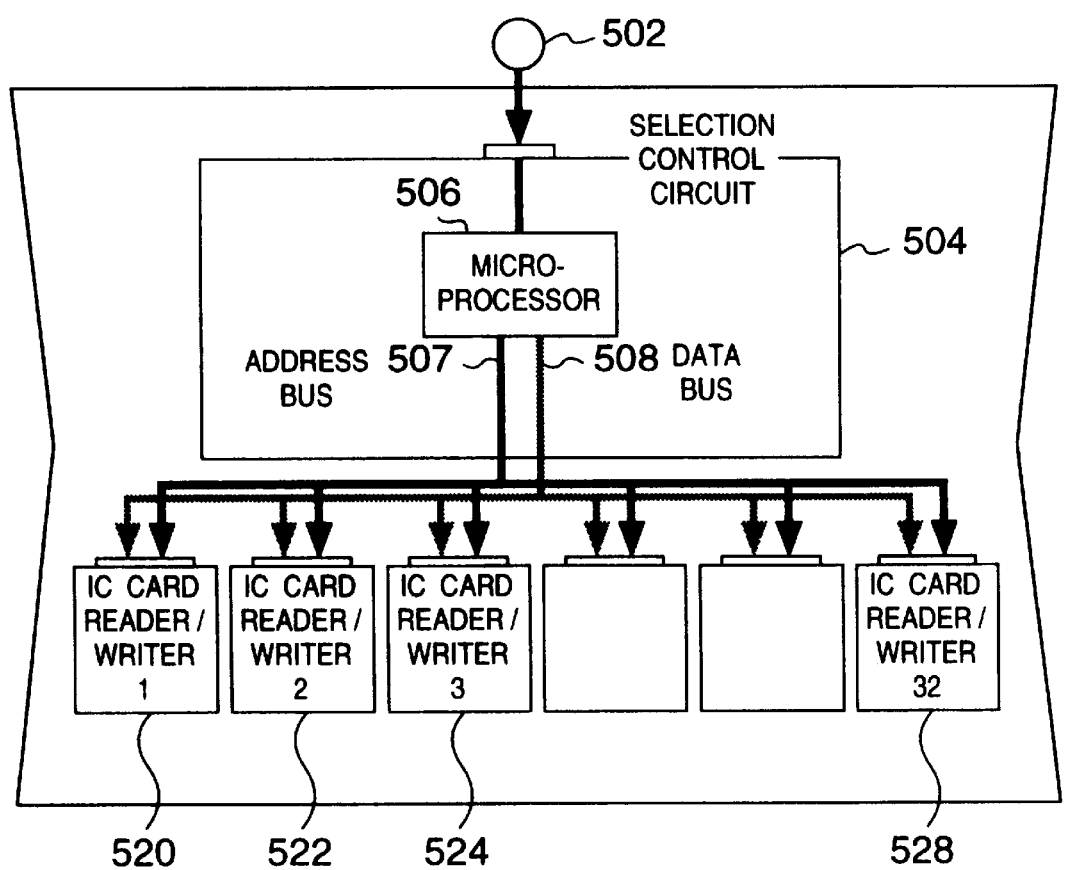
FIG. 10 is a block diagram showing a control circuit of the value box according to each embodiment of the invention.

FIG. 10 is a block diagram showing the control circuit of the value box mentioned above. The control circuit is provided in all of the forms of the above embodiments. For example, it is shown at 15A in FIG. 5. In FIG. 10, for example, in case of the bank branch system 1, the input terminal 502 is a line connected to a communication line or the like in the system through the transaction management terminal 16 for electronic money and is connected to the terminal 16. The input terminal 502 is also connected to the public communication line through the relay computer and is connected to the value box 15 of another system or the IC card 10 as a petty current electronic money holding apparatus through the public communication line. The input terminal 502 is a connecting line to the workstation 26 in the retail store system 2 and is a connecting line to the relay computer 17 in the bank computer center 5. The workstation 26 functions to transmit the information of the value box onto the communication line in the retail store system or to receive the information on the communication line and send it to the value box. The relay computer 17 functions to transmit and receive data by using the public line. The control circuit in the value box 15 has a selection control circuit 504 to select IC card readers/writers 520, 522, 524, . . . , and 528. The selection control circuit is constructed by, for example, a microprocessor 506.

In electronic money systems, money can be transferred and received only between one of a pair (one IC card in the embodiment) mentioned above and of a the other pair (the other IC card) and money cannot be transferred and received to/from the other apparatus in principle. Therefore, in the value box 15 of the bank branch system 1, as described above, the electronic money of the necessary amount is uniformly distributed and held into the IC cards inserted to the IC card readers/writers 520, 522, 524, . . . , and 528. Therefore, the total of the holding amounts of all of the IC cards is equal to the necessary amount. For example, when a request to withdraw the electronic money comes from the end user, the IC card reader/writer 520 is selected by the selection control circuit. Such a selection is accomplished by a method whereby the address of the IC card reader/writer 520 is selected by the microprocessor 506 via an address bus 507 and data is transferred and received through a data bus 508. When a next request comes at the same time, the selection control circuit selects the next IC card reader/writer 522. In a manner similar to the above, since the pair (IC card 10 in the embodiment) in the cashbox is sequentially selected in accordance with a predetermined order, even if a few requests are simultaneously generated, the apparatus can simultaneously cope with them. In case of the bank, therefore, the requests from a plurality of customers can be promptly processed without making the customers who want to withdraw or deposit money wait. The same shall also apply to the value box in the bank computer center 5. In the retail store system 2, it is also possible to promptly cope with requests from the sales windows 21 and 22 without likewise making them wait.

By sequentially selecting the IC card readers/writers in accordance with a predetermined order by the selection control circuit, the numbers of writing times to the IC cards can be uniformed and the reliability of the IC card can be maintained. Since the numbers of rewriting times of all of the IC cards are set to almost the same value, the maintenance can be easily executed. In case of replacing a card, it is economical.

Figure 11:
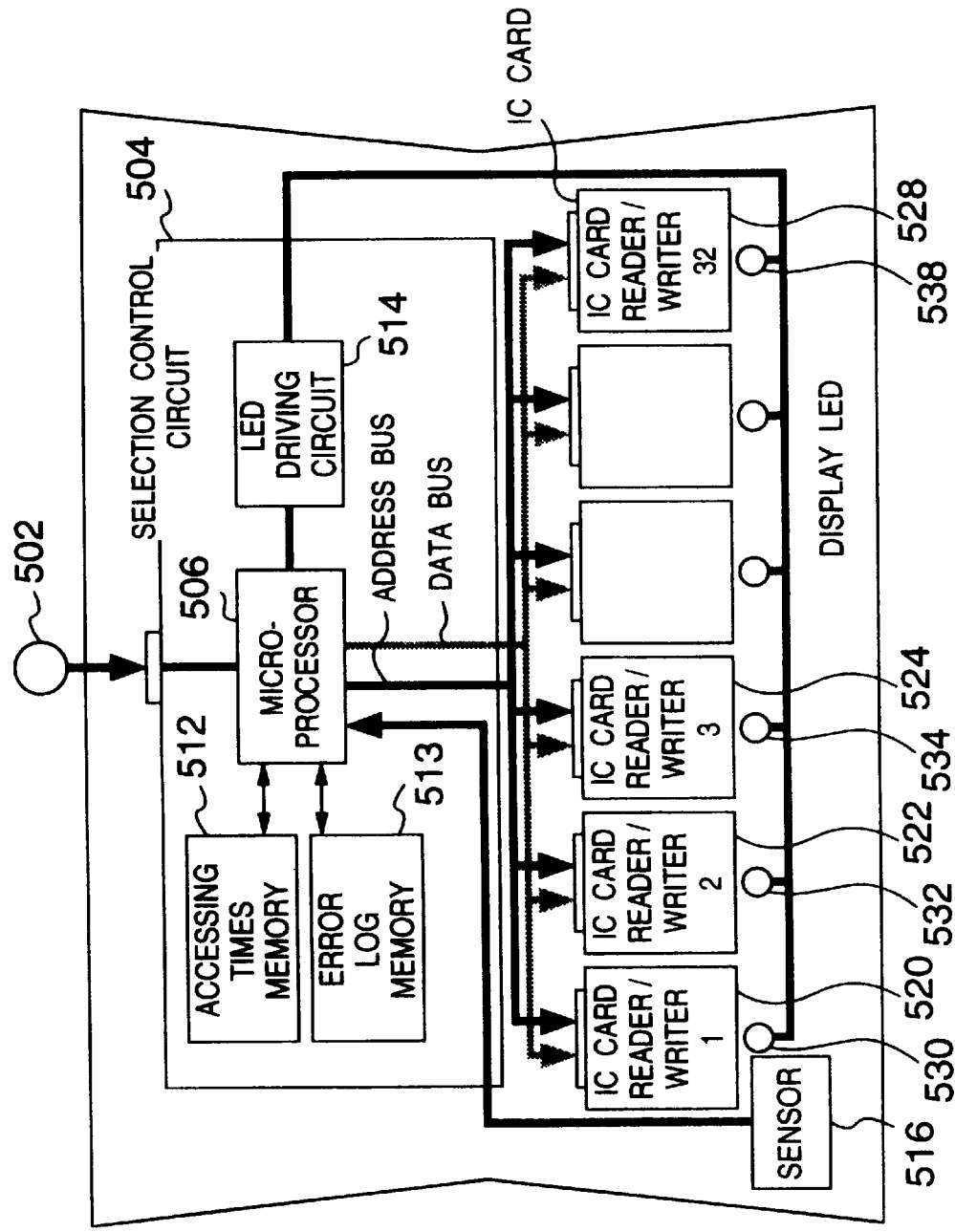
FIG. 11 is a block diagram showing another embodiment of a block diagram of the control circuit of the value box shown in FIG. 10.

FIG. 11 shows another embodiment. The selection control circuit 504 has: the microprocessor 506; an accessing times memory 512 for storing the number of writing times of each IC card reader/writer; an error log memory 513 to store a situation or career when an error occurs; and an LED driving circuit 514 for driving and lighting on LEDs 530, 532, 534, . . . , and 538 for displaying whether each IC card reader/writer is normal or abnormal.

When a request for a withdrawal or payment of an electronic money comes to the value box in FIG. 11, the selection control circuit 504 finds the IC card reader/writer which is at present coping and determines whether the next IC card reader/writer can cope or not. For example, whether there is an abnormality in the next IC card reader/writer or the IC card inserted there or not, whether the IC card holds the money which can meet the request in case of the request to withdraw the electronic money or not, and the like are examined. When those conditions are satisfied, the IC card reader/writer is settled. When the conditions are not satisfied, the next IC card reader/writer is further examined. In this manner, the IC card reader/writer to cope with the request is selected. When the abnormality is detected, the LED is lit on and the abnormality is displayed.

In the value box, since a case of treating a great quantity of public funds is presumed, a sensor 516 is provided. When the door of the cashbox is opened, the microprocessor 506 automatically locks the IC card inserted in each IC card reader/writer so as to inhibit a change in money amount through each IC card reader/writer. At least the payment of money from the IC card is inhibited. Thus, even if the IC card of each IC card reader/writer is pulled out, no electronic money can be withdrawn from the IC card. However, the amount of money held can be seen. Thus, the safety can be raised. The method whereby the sensor 516 detects the opening of an opening/closing mechanism of the cashbox and the IC card is locked has been described. However, it is also possible to use another method whereby each time the microprocessor selects each IC card reader/writer, the IC card is unlocked and when the measure to the request is finished, the IC card is locked in order to inhibit the withdrawal of the electronic money. The sensor 516 can detect the operation of the opening/closing mechanism such as a door or the like. However, in place of it, even by detecting the operation of a key provided in the opening/closing mechanism, a similar effect can be accomplished. Namely, the opening of the key is detected, the IC card reader/writer automatically sends a command to a CPU 104 (FIG. 13) in the IC card inserted there. The microprocessor 506 sends a command to the CPU 104 through each IC card reader/writer. The CPU which received the command stores the inhibition of the withdrawal of the money into an EEPROM 105. The withdrawal cannot be performed until the stored contents are erased. The erasure of the stored contents is executed by inputting a personal identification number and, after that, sending an instruction of "unlock" for enabling the payment to the CPU 104 in the IC card through the IC card reader/writer.

Figure 12:
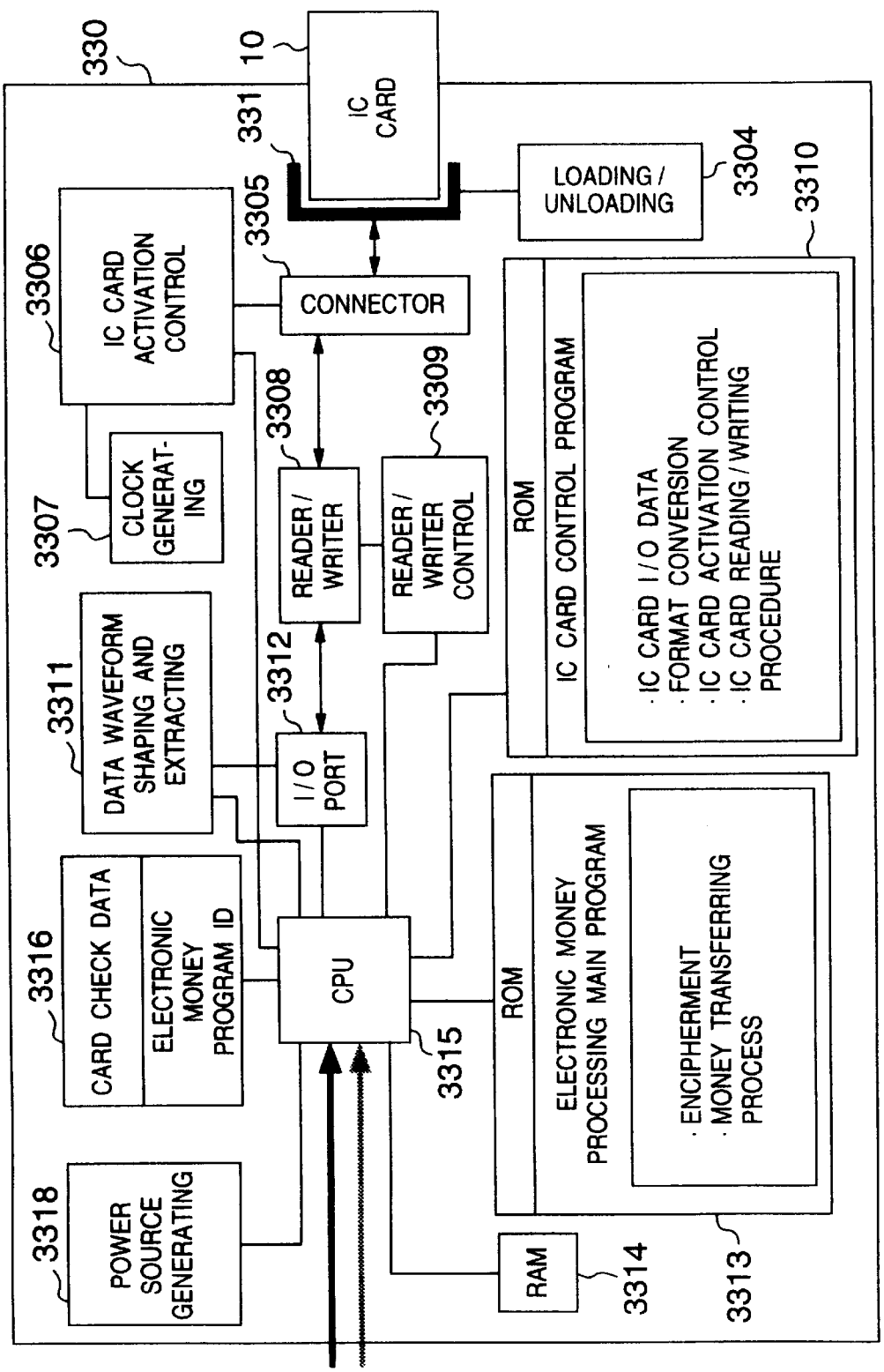
FIG. 12 is a block diagram showing a construction of IC card readers/writers in FIGS. 10 and 11.

FIG. 12 is a block diagram showing a construction of the IC card reader/writer in FIGS. 10 and 11. Among the blocks, the blocks other than an IC card inserting slot 331, a connector 3305, and a power source 3318 are constructed by one IC. Since such an IC circuit has a program in a function IC to control the withdrawal and payment of a money of the IC card 10, a situation such that the IC card reader/writer is operated by an illegal method and an illegal action is performed, can be prevented.

Reference numeral 330 denotes a main body portion of the IC card reader/writer; 3304 a loading/unloading circuit; 3305 the connector; 3306 an IC card activation control circuit; 3307 a clock generating circuit; 3308 a reader/writer circuit; 3309 a reader/writer control circuit; 3310 an ROM; 3311 a data waveform shaping & extracting circuit; 3312 an I/O port; 3313 a main program ROM; 3314 an RAM; 3315 a CPU; 3316 an IC card check data storing unit; and 3318 the power source generating circuit.

The IC card reader/writer is constructed by providing the following component elements in the main body portion 330: the IC card inserting slot 331 to insert the IC card 10 into the IC card reader/writer main body; loading/unloading circuit 3304 to drive the IC card 10; connector 3305 to the IC card 10; activation control circuit 3306 to activate the IC card 10 by supplying a power source and a clock signal to the IC card 10; clock generating circuit 3307; reader/writer circuit 3308 to read and write data from/to the IC card 10; reader/writer control circuit 3309 to control the operation of the reader/writer circuit 3308; ROM 3310 in which a program for the CPU 3315 to control the fundamental operation of the IC card according to the ISO standard has been stored; data waveform shaping & extracting circuit 3311 to execute a waveform shaping and a data extraction of the data read out from the IC card 10; I/O port 3312 for the data input/output; operations between the reader/writer circuit 3308 and CPU 3315; ROM 3313 in which a processing main program of a value box for the CPU 3315 to process the electronic money stored in the IC card 10 has been stored; RAM 3314 which is used for the CPU 3315 to process the data; IC card check data storing unit 3316 in which ID data to discriminate whether the information stored in the IC card 10 is electronic money information or not has been stored; and power source generating circuit 3318 to supply an electric power which is supplied through a connector conformed with the PCMCIA standard to each circuit.

Now, when the IC card 10 is inserted into the IC card inserting slot 331 of the main body 330 of the IC card reader/writer 520, . . . , or 528, the IC card 10 is automatically loaded by the operation of the loading/unloading circuit 3304, so that the connector 3305 and a contact portion of the IC card 10 are come into contact with each other. The CPU 3315 recognizes it, gives an instruction to the control circuit 3306 to activate the IC card 10, and supplies the power source and the clock to the IC card 10, thereby activating the card.

After that, the CPU 3315 reads out the ID data indicative of the kind of information stored in the IC card 10 from the IC card 10 through the connector 3305, reader/writer circuit 3308, and the like. Those operations are executed in accordance with the ISO standard by the program stored in the ROM 3310. As a program stored in the ROM 3310, for example, there are a format exchange for matching a data input/output format with the IC card with a protocol of the IC card, an activating procedure of the IC card, a reading/writing procedure of data with the IC card, and the like.

The CPU 3315 compares the ID data read out from the IC card 10 as mentioned above with the contents in the IC card check data storing unit 3316, thereby discriminating whether the electronic money information has been stored in the IC card 10 or not. When it is confirmed that the electronic money information has been stored in the IC card 10, the IC card reader/writer enables an electronic money processing main program stored in the ROM 3313 to be operated.

Figure 13:
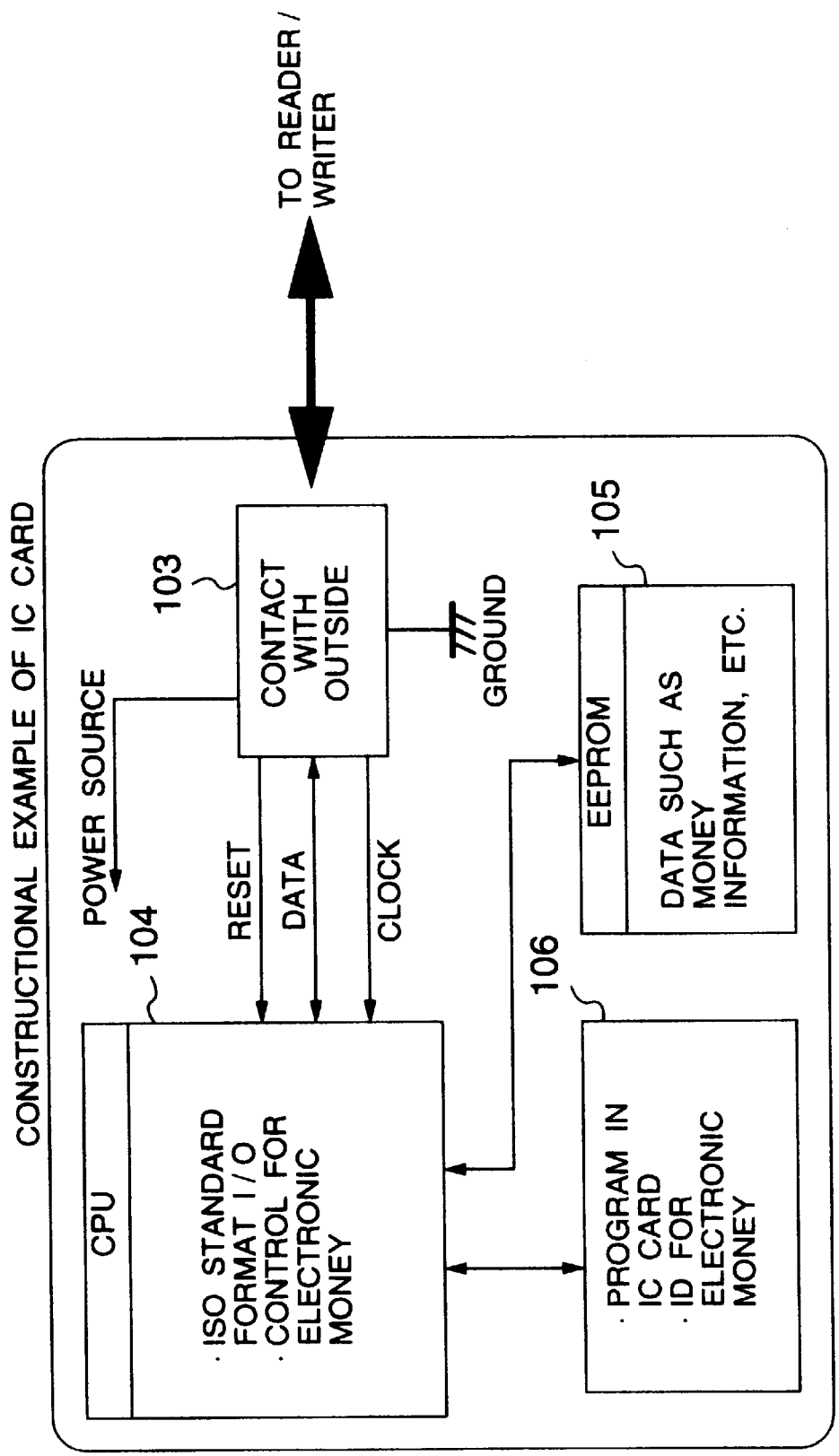
FIG. 13 is a block diagram showing a specific constructional example of an IC card 10.

FIG. 13 is a block diagram showing a specific constructional example of the IC card 10. It is desirable that the above block is constructed by one independent IC circuit for the purpose of prevention of an illegal use of an electronic money. The IC circuit is connected to the outside by a contact 103 with the outside. Reference numeral 103 denotes the contact portion with the outside, namely, a connecting portion which is connected to the connector 3305 of the IC card reader/writer; 104 the CPU; 105 the EEPROM; and 106 ROM. The IC card 10 in which the electronic money has been stored is constructed by providing: the contact portion 103 with the outside for transmitting and receiving a signal, a power source, a clock, a reset signal, and the like to/from the outside; CPU 104 for controlling the operation of the IC card 10; ROM 106 in which a program for the CPU 104 has been stored; and a rewritable memory to hold data of the electronic money or the like, for example, a memory such as EEPROM 105 or the like.

In the above description, the CPU 104 executes a protocol control for inputting and outputting data in accordance with the ISO standard and a process such as encipherment or the like in accordance with the program stored in the ROM 106. As component elements of the value box, money amount information such as a holding money amount and the like as contents holding the electronic money, career information of the deposit and withdrawal of a money, and the like are stored into the EEPROM 105.

The fundamental operations of the card reader/writer constructed as mentioned above are executed by accessing to the electronic money in the IC card 10 by the main program for a value box in the ROM 3313 enclosed in the main body 330 of the IC card reader/writer.

With the above construction, there is an advantage such that, in general, by sealing the function to access the electronic money information in the IC card 10 into an exclusive-use device rather than by installing such a function to a personal computer or the like in which a program source can be easily accessed, the safety for an illegal access or illegal operation from the outside can be raised. Therefore, a subprogram which is provided in the workstation 26, electronic money transaction management terminal, personal computer 32, or the like in FIG. 1 is limited to only the function to give auxiliary information such as movement destination, movement money amount, and the like of money to the IC card reader/writer.

Figure 14:
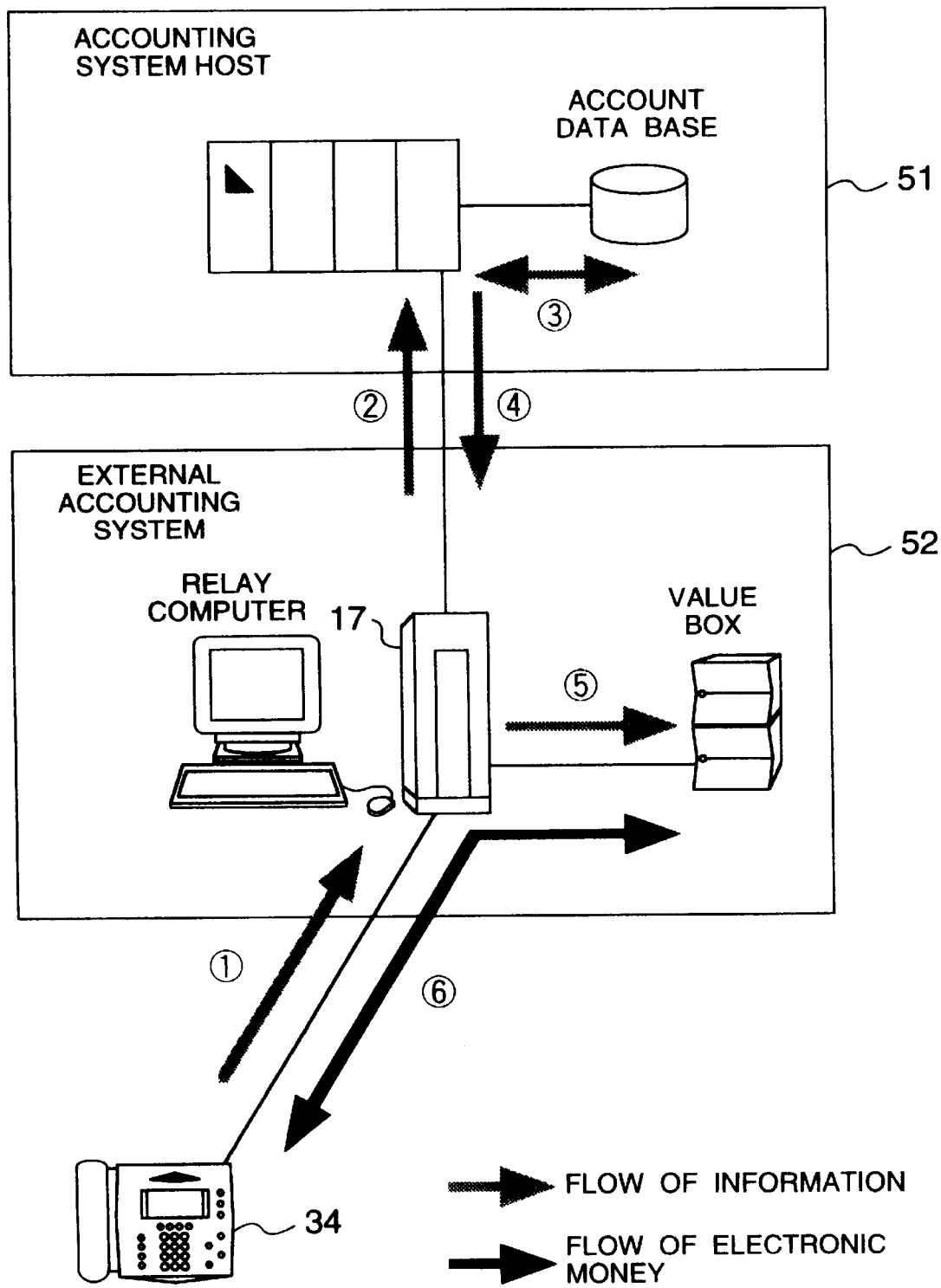
FIG. 14 is a diagram for explaining a procedure for withdrawing or depositing an electronic money.

FIG. 14 is a diagram for explaining a countermeasure which is executed by the bank computer center in FIG. 1 in the case where there is a request for withdrawal or deposit of an electronic money from an individual bank customer.

[Procedure 1]

For example, it is assumed that there is a request front the telephone 34 which can cope with the IC card. The same shall also similarly apply to the case where a request is generated from the deposit and payment machine 14 in place of the telephone 34. The relay computer 17 is connected to a host computer of the system of the counting system through the public communication line.

[Procedure 2]

A personal identification number is inputted from the telephone 34 and is sent to the host computer through the relay computer 17. The relay computer 17 confirms the ID to the host computer and confirms whether it is possible to meet the request from a person.

[Procedure 3]

When it is determined to be correct from the information of the card used or the personal identification number inputted, a payment request money amount from the person (the same shall also apply to the deposit) is inputted and the relay computer 17 supplies the money amount to the host computer. The host computer reads out the personal account from the data base and executes a defrayal process.

[Procedure 4]

The host computer confirms the balance or the like of the personal bank account and issues a permission of the defrayal of the electronic money to the relay computer 17.

[Procedure 5]

The relay computer 17 issues a payment request to the selection control circuit 504 in the value box. The selection control circuit 504 selects a corresponding one of the IC card readers/writers 520, . . . , and 528.

[Procedure 6]

The CPU 3315 in the selected IC card reader/writer accesses to the CPU in the IC card 10 in accordance with the processing program in the ROM 3313. The CPU 3315 of the IC card reader/writer accesses to the IC card through the IC card reader/writer provided for the telephone 34. The IC card is connected to the IC card and the withdrawal and deposit of an electronic money are executed between them.

Even if a plurality of requests for the withdrawal and deposit are simultaneously generated to the value box, the value box respectively selects and allocates the pair (in the embodiment, the IC card is used as one specific example) corresponding to the request, the apparatus can promptly cope with it without a delay of the process.

Since the accessing program of the memory to hold the electronic money is provided for each reader/writer in the value box, the illegal action of the electronic money can be prevented and the safety can be raised. According to the invention as described above, the value box in the electronic money system which can process in response to a plurality of requests for the withdrawal and deposit without a delay can be provided.

What is claimed is:

1. A holding apparatus for data concerning electronic money comprising:

a plurality of electronic circuits for holding data concerning said electronic money; and a plurality of reading/writing circuits for performing deposit or withdrawal of said electronic money to or from said electronic circuits for holding data concerning the electronic money, in which on the basis of a deposit or withdrawal request of the electronic money, the deposit or withdrawal of the electronic money is executed by any of said reading/writing circuits to or from said electronic circuits, and wherein said holding apparatus has a selecting circuit for selecting an electronic circuit corresponding to said request from any one of said plurality of electronic circuits which is not under a selected state, wherein the electronic circuit selected by said selected circuit will enter a state of not responding to any request after completing a response to said request and in response to said request, the deposit or the withdrawal of said electronic money is executed by said reading/writing circuit to or from said electronic circuit selected by said selecting circuit.

2. A holding apparatus for data concerning electronic money in which by reading or writing information of electronic money by a reading/writing circuit from a card for holding data concerning said electronic money, deposit or withdrawal of said electronic money to or from said card for holding data concerning the electronic money is executed on the basis of a request for the withdrawal or the deposit of said electronic money, wherein a plurality of said reading/writing circuits are arranged, a selecting circuit for selecting any one of said reading/writing circuits which is not under a selected state is further provided, and on the basis of said request for the withdrawal or deposit of said electronic money, the withdrawal or deposit of the electronic money is executed to said card by said reading/writing circuit selected by said selected circuit.

3. A holding apparatus for data concerning electronic money, comprising:

a plurality of card inserting slots arranged in a casing having an opening/closing door;

a plurality of reading/writing circuits which are arranged in correspondence to said card inserting slots and are used for cards inserted into said card inserting slots; and a selecting circuit for selecting any one of said reading/writing circuits which is not under a selected state, wherein deposit or withdrawal of said electronic money is executed to or from a card inserted in the card inserting slot corresponding to said selected reading/writing circuit.

4. A holding apparatus for data concerning electronic money, comprising:

a casing having an opening/closing door;

a plurality of card inserting slots arranged in said casing on an open surface behind said door;

reading/writing circuits provided in said casing in correspondence to said card inserting slots; and a selecting circuit for selecting any one of said reading/writing circuits which is not under a selected state, wherein electronic money held in a card inserted in the card inserting slot corresponding to said selected reading/writing circuit is withdrawn or deposited by said selected reading/writing circuit.

5. A holding apparatus for data concerning electronic money, comprising:

a plurality of card inserting slots for inserting a plurality of cards, each card having an IC including a memory to record information of the electronic money and a CPU to control a writing operation of said information into said memory, said cards being arranged in a casing with an opening/closing door, said holding apparatus further including:

a plurality of reading/writing circuits which are arranged in correspondence to said card inserting slots and each of which is used to write or read data to and from said card by transmitting and receiving information to and from said CPU in said card inserted into said card inserting slot and a selecting circuit for selecting any one of said reading/writing circuits which is not under a selected state, wherein deposit or withdrawal of the electronic money is executed to or from the card inserted in the card inserting slot corresponding to said selected reading/writing circuit.

6. An apparatus according to claim 2, which further includes a display apparatus for displaying a number of times said card is accessed.

7. An apparatus according to claim 2, which further includes means for generating a warning when a number of times said card is accessed reaches a predetermined number.

8. An apparatus according to claim 2, wherein
said selecting circuit selects in accordance with a predetermined order.

9. An apparatus according to claim 2, which includes a circuit for setting said card into a state in which the withdrawal of the electronic money from the card is prohibited.

10. An apparatus according to claim 2, which further includes
means for detecting an opening of said door; and
a circuit for setting said card into a state in which the withdrawal of the electronic money from the card is prohibited on the basis of an output of said detecting means.

11. An apparatus according to claim 2, which further includes a display apparatus for displaying an abnormality of said card.

12. An apparatus according to claim 3, which further includes a display apparatus for displaying abnormality of said cards, said display apparatus being provided on said casing.

13. An apparatus according to claim 3, which further includes a display apparatus for displaying an abnormality of said card provided in correspondence to each of said card inserting slots in said casing.

14. A holding apparatus for data concerning electronic money, comprising:
a casing having an opening/closing door;
a main body which is arranged in said casing and can be moved in and out;
a plurality of card inserting slots provided on said main body;
reading/writing circuits provided in said main body in correspondence to said card inserting slots; and
a selecting circuit for selecting any one of said reading/writing circuits which is not under a selected state,
wherein the electronic money held in a card inserted in said card inserting slot corresponding to said selected reading/writing circuit is withdrawn or deposited by said selected reading/writing circuit.

15. A holding apparatus for data concerning electronic money comprising:
a plurality of electronic circuits respectively including information concerning electronic money; and
a selection circuit for deciding to select any one among said plurality of electronic circuits which is not under a selected states based on a request.

16. A holding apparatus for data concerning electronic money according to claim 15, wherein said electronic money information is related to withdrawal or deposit of electronic money in response to said request of withdrawal or deposit of electronic money.

17. A holding apparatus for data concerning electronic money according to claim 15, wherein said plurality of electronic circuits are selected in a predetermined order.

18. A holding apparatus for data concerning electronic money according to claim 15, wherein each of said plurality of electronic circuits includes a reading/writing circuit for reading/writing information of electronic money from and to said selected electronic circuit.

19. A holding apparatus for data concerning electronic money comprising:
a casing having a door with a key;
a plurality of electronic circuits respectively including electronic money information and provided in said casing; and
a selecting circuit for deciding to select any one of said plurality of electronic circuits which is not under a selected state based on a request for the withdrawal or deposit of electronic money, and
wherein said plurality of electronic circuits execute withdrawal or deposit of electronic money in response to a request of withdrawal or deposit of electronic money from an outside electronic circuit including electronic money while said electronic circuit residing outside of said casing is connected with one of said plurality of electronic circuits which is not under a selected state.

20. A holding apparatus for data concerning electronic money according to claim 19, further comprising:
a plurality of displays, each indicating operation states of one of said plurality of electronic circuits, respectively.

21. A holding apparatus for data concerning electronic money according to claim 19, wherein said outside electronic circuit is in an integrated circuit inserted in a device selected from the group consisting of a banking teller, a cash automatic teller machine, a personal computer, and an IC card telephone.

22. A holding apparatus for data concerning electronic money according to claim 19, wherein each of said plurality of electronic circuits includes a reading/writing circuit for reading/writing information of electronic money from and to said electronic circuit.

23. A holding apparatus for data concerning electronic money according to claim 19, wherein said electronic money information is related to withdrawal or deposit of electronic money in response to said request of withdrawal or deposit of electronic money.

24. A banking system comprising:
an accounting system for recording savings of accounts;
an external accounting system having a holding apparatus for data concerning electronic money and a plurality of electronic circuits respectively including electronic money information; and
a selecting circuit for deciding to select any one of said plurality of electronic circuits which is not under a selected state, and
wherein said plurality of electronic circuits of said holding apparatus execute withdrawal or deposit of electronic money in response to a request of withdrawal or deposit of electronic money from an outside electronic circuit of said accounting system to said external accounting system.

25. A holding apparatus for data concerning electronic money according to claim 24, wherein said electronic money information is related to withdrawal or deposit of electronic money in response to said request of withdrawal or deposit of electronic money.

26. A holding apparatus for data concerning electronic money according to claim 24, wherein said outside electronic circuit is in an integrated circuit inserted in a device selected from the group consisting of a banking teller, a cash automatic teller machine, a personal computer, and an IC card telephone.

27. A holding apparatus for data concerning electronic money comprising:
a plurality of electronic circuits respectively including electronic money information and connected via connectors to an outside electronic circuit including electronic money inserted into said holding apparatus to connect to one of said connectors in request of withdrawal or deposit of electronic money; and
a selection circuit for deciding to select one among said plurality of electronic circuits which is not under a selected state to connect said one electronic circuit with said inserted electronic circuit based on a predetermined condition when said inserted electronic circuit is inserted into said holding apparatus;

said predetermined condition being selection among said plurality of electronic circuits in sequential order thereof.

28. A holding apparatus for data concerning electronic money according to claim 27, wherein each of said plurality of electronic circuits of said holding apparatus includes a reading/writing circuit for reading/writing information of electronic money from and to said inserted outside electronic circuit to execute withdrawal or deposit of electronic money in response to said request of withdrawal or deposit of electronic money.

29. A holding apparatus for data concerning electronic money according to claim 27, wherein each of said plurality of electronic circuits of said holding apparatus includes a reading/writing circuit for reading/writing information of electronic money from and to said inserted outside electronic circuit.

30. A holding apparatus for data concerning electronic money according to claim 27, further comprising:

a plurality of displays each indicating operation states of one of said plurality of electronic circuits, respectively.

31. A holding apparatus for data concerning electronic money according to claim 27, further comprising a circuit for counting a number of connections of inserted electronic circuits to each of said plurality of electronic circuits and changing said predetermined condition so that the number of inserted electronic circuits from each of said plurality of electronic circuits of said holding apparatus is even.

32. A holding apparatus for electronic money comprising:

a casing having a door with a key;

a plurality of electronic circuits respectively including electronic money information and provided in said casing; and a selecting circuit for selecting one of said plurality of electronic circuits which is not under a selected state, wherein said plurality of electronic circuits of said holding apparatus execute withdrawal or deposit of electronic money in response to a request of withdrawal or deposit of electronic money from an outside electronic circuit including electronic money inserted into said holding apparatus while said outside electronic circuit is connected with one of said plurality of electronic circuits.

33. A holding apparatus for data concerning electronic money according to claim 32, further comprising:

a plurality of displays each indicating operation states of one said plurality of electronic circuits, respectively.

34. A holding apparatus for data concerning electronic money according to claim 32, wherein each of said plurality of electronic circuits of said holding apparatus includes a reading/writing circuit for reading/writing information of electronic money from/to said inserted electronic circuit to execute withdrawal or deposit of electronic money in response to said request of withdrawal or deposit of electronic money.

35. A holding apparatus for data concerning electronic money according to claim 32, wherein each of said plurality of electronic circuits of said holding apparatus includes a reading/writing circuit for reading/writing information of electronic money from/to said inserted electronic circuit.

36. A holding apparatus for data concerning electronic money according to claim 32, further comprising a circuit for counting a number of connections of inserted electronic circuits to each of said plurality of electronic circuits and operating to make the number of inserted electronic circuits from each of said plurality of electronic circuits of said holding apparatus even.

37. A banking system comprising:

an accounting system for recording savings of accounts;

an external accounting system having a holding apparatus for data concerning electronic money including:

a casing having a door with a key;

a plurality of electronic circuits respectively including electronic money information and provided in said casing; wherein said plurality of electronic circuits of said holding apparatus execute withdrawal or deposit of electronic money in response to a request of withdrawal or deposit of electronic money from an outside electronic circuit said accounting system to said external accounting system, and a selecting circuit for selecting one of said plurality of electronic circuits which is not under a selected state, and wherein each of said plurality of electronic circuits of said holding apparatus includes a reading/writing circuit for reading/writing information of electronic money from and to said outside electronic circuit to execute withdrawal or deposit of electronic money in response to said request of withdrawal or deposit of electronic money.

38. A holding apparatus for data concerning electronic money according to claim 37, further comprising:

a plurality of displays each indicating operation states of one of said plurality of electronic circuits, respectively.

39. A holding apparatus for data concerning electronic money according to claim 37, wherein each of said plurality of electronic circuits of said holding apparatus includes a reading/writing circuit for reading/writing information of electronic money from and to said inserted electronic circuit.

40. A holding apparatus for data concerning electronic money according to claim 37, further comprising a circuit for counting a number of connections of inserted outside electronic circuits to said plurality of electronic circuits and operating to make the number of inserted outside electronic circuits from each of said plurality of electronic circuits of said holding apparatus even.

41. A holding apparatus according to claim 1, wherein said selecting circuit selects an electronic circuit in response to said request from among a plurality of electronic circuits not under a selected state.

* * * * *